Figure 1A:
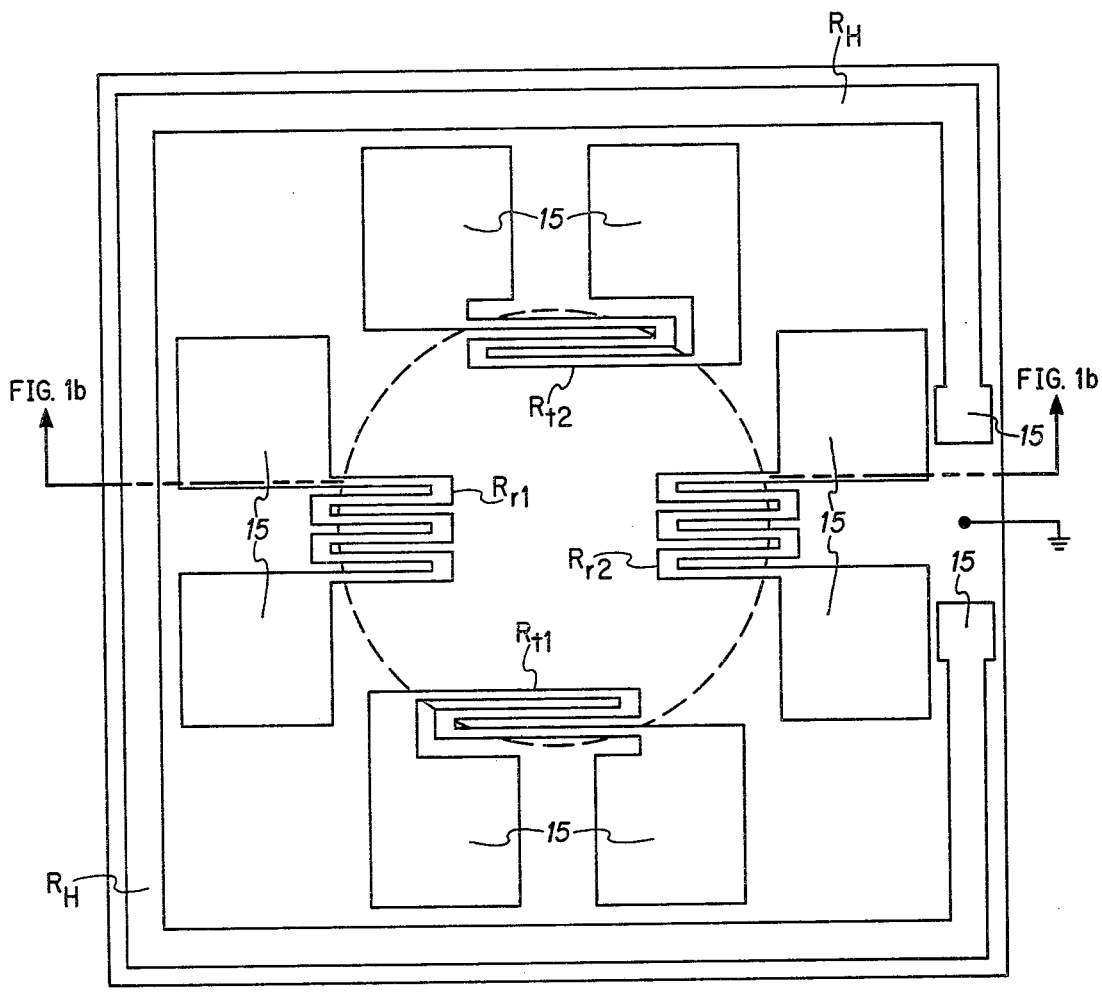

United States Patent [19]

Runyan

[11] 4,198,868
[45] Apr. 22, 1980

[54] STRAIN GAUGE APPARATUS AND MEANS FOR TREATING TEMPERATURE DEPENDENCY

[75] Inventor: Wesley G. Runyan, Cedar Rapids, Iowa

[73] Assignee: Rockwell International Corporation, El Segundo, Calif.

[21] Appl. No.: 11,252

[22] Filed: Feb. 12, 1979

[51] Int. Cl.$^2$ .................................................. G01L 19/04
[52] U.S. Cl. ........................................ 73/708; 73/727; 73/766
[58] Field of Search ................. 73/708, 720, 721, 726, 73/727, 766, 777, 141 A; 338/4, 2; 324/DIG. 1, 65 R

[56] References Cited

U.S. PATENT DOCUMENTS

| | | | |
|---|---|---|---|
| 3,460,378 | 8/1969 | Cepollina | 73/766 |
| 3,470,738 | 10/1969 | Laimins | 73/766 |
| 3,498,118 | 3/1970 | Ruge | 73/766 |
| 3,841,150 | 10/1974 | Pearson | 73/766 |

FOREIGN PATENT DOCUMENTS 2631199  1/1978  Fed. Rep. of Germany ............ 73/766

Primary Examiner—Donald O. Woodiel
Attorney, Agent, or Firm—Terry M. Blackwood; Richard A. Bachand; H. Fredrick Hamann

[57] ABSTRACT

Strain gauge characteristic stabilization apparatus comprises a parallel connected combination of strain sensitive resistance (i.e., $R_{eq}$), temperature conditioning means proximate $R_{eq}$, and circuit means between $R_{eq}$ and the temperature conditioning means. The circuit means senses deviations in $R_{eq}$ from a predetermined value and causes the temperature conditioning means to control the temperature of $R_{eq}$ so as to reduce the deviations substantially to zero.

6 Claims, 4 Drawing Figures

STRAIN GAUGE APPARATUS AND MEANS FOR TREATING TEMPERATURE DEPENDENCY

The present invention relates to strain gauge apparatus and more particularly to piezoresistive pressure sensors and the treatment of temperature effects thereon.

Strain sensitive apparatus of the semiconductor piezoresistive type is well known in the art. See for instance (a) Journal of Applied Physics, October 1961, Vol. 32 No. 10, Pages 2008-2019 (b) U.S. Pat. No. 3,049,685 (c) U.S. Pat. No. 3,456,226 and (d) U.S. Pat. No. 3,641,812. Such devices commonly comprise a flexible silicon diaphragm in or on which a plurality of piezoresistive strain gauge elements are essentially integrally formed. The diaphragm commonly comprises crystalline silicon of one conductivity type with the strain gauge piezoresistors formed of opposite conductivity type by diffusion or other appropriate process whereby a p-n junction is achieved. With the diaphragm rigidly supported at its periphery, a transverse force applied centrally to one face causes flexure strain of the diaphragm and attendant changes in resistance of the piezoresistors. Usually at least two of the piezoresistors are arranged relative to each other on the diaphragm so that the force induced diaphragm movement causes one piezoresistor to increase in resistance while the other piezoresistor decreases in resistance. Thus when the force is due to pressure, one resistor varies directly with pressure and the other resistor varies inversely with pressure.

However, the values of these piezoresistors are dependent not only on pressure but also on temperature. More particularly, the resistance of each of these piezoresistors increases with temperature and thus a temperature change, if not properly dealt with, can infuse errors into measurement of pressure with such devices. This problem of piezoresistance dependency on temperature has been recognized and treated by various forms of signal conditioning and temperature compensating circuitry. See for instance U.S. Pat. Nos. 3,956,927; 3,841,150; 3,836,796; and 3,457,493. In accordance with the present invention there is provided simplified apparatus for stabilizing the operating characteristics of such devices and making same more immune to temperature changes in their environment.

Figure 1B:
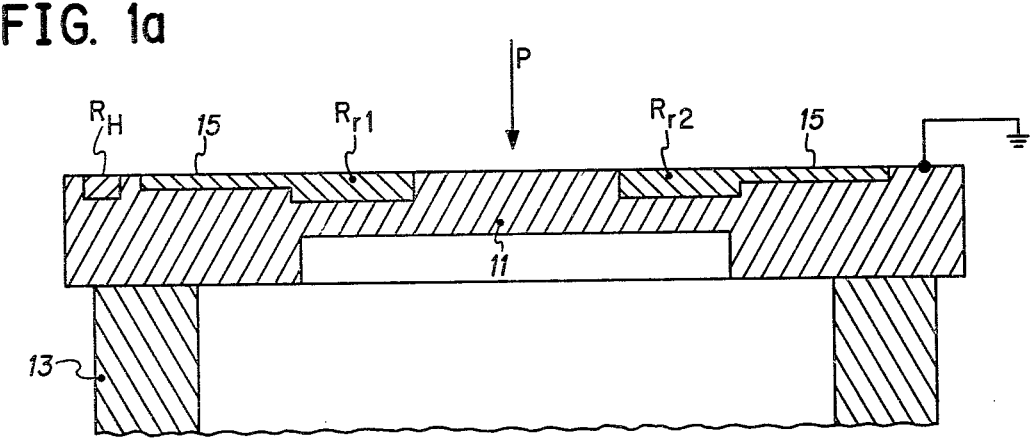
Figure 2:
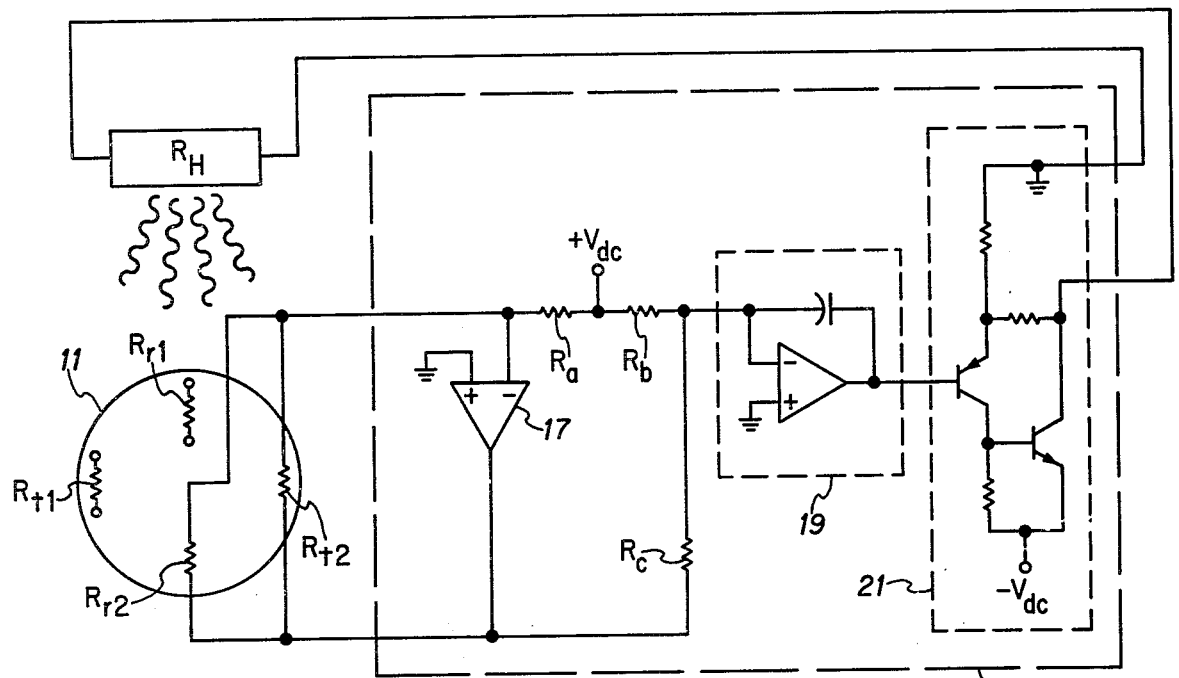
Figure 3:
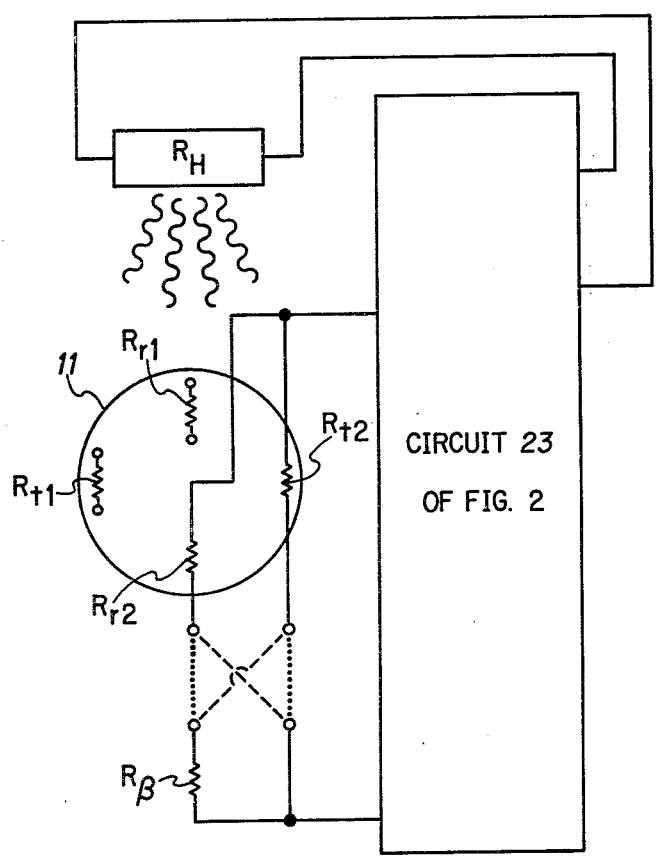

These and other features, advantages, and objects of the present invention will become more apparents upon reference to the following specification, claims, and appended drawings in which:

FIGS. 1a and 1b are diagrammatic views, top and side sectional respectively, representing the presently employed piezoresistive semiconductor pressure sensor, and FIGS. 2 and 3 are circuit schematics representing presently preferred inventive embodiments.

Referring now to FIGS. 1a and 1b, therein is represented a piezoresistive pressure sensor assembly employed with the present invention. In accordance with the descriptions hereinabove, a diaphragm 11 of n-type material is secured at its periphery to a tube 13. Diffused into diaphragm 11 are four piezoresistors $R_{r1}$, $R_{r2}$, $R_{t1}$, and $R_{t2}$, each of p-type material. A resistor $R_H$, also of p-type material and diffused into the n-type material, is located around the chip periphery. Metallized pads 15 permit wire connections to be made to said resistors. The n-type material is connected to ground reference potential. As force or pressure P increases, the diaphragm flexes slightly and causes the resistances of said four piezoresistors to change. More particularly, the resistances of $R_{r1}$ and $R_{r2}$ increase with increasing pressure and the resistances of $R_{t1}$ and $R_{t2}$ decrease with increasing pressure. Also, and as pointed out hereinabove, the resistances of all four piezoresistors increase with increasing temperature.

Referring now to FIG. 2, the circuitry therein illustrated comprises a closed loop system wherein a signal indicative of the temperature of all four FIG. 1 piezoresistors is derived from a pair of said piezoresistors and is used to control the heat output of a heat generator which in turn controls the temperature of said piezoresistors. More particularly, FIG. 1 piezoresistors $R_{r2}$ and $R_{t2}$ are connected in parallel and their equivalent composite resistance $R_{eq}$ ($R_{eq}=R_{r2}R_{t2}/(R_{r2}+R_{t2})$) is connected between the output and the inverting input of operational amplifier 17. The non-inverting input of op-amp 17 is tied to ground. Also connected between the op-amp 17 output and inverting input is the series connection of resistances $R_a$, $R_b$, and $R_c$. The junction between $R_a$ and $R_b$ is connected to voltage source $+V_{dc}$ and the junction between $R_b$ and $R_c$ is fed to the input of integrator 19. The output of integrator 19 is connected to the input of power amplifier 21 which in turn drives the FIG. 1 resistor $R_H$ causing same to output heat and control the piezoresistor temperature. In operation, the FIG. 2 circuit applies voltage to heater $R_H$ and heats the piezoresistance device until piezoresistors $R_{r2}$ and $R_{t2}$ increase their values to a level such that $R_{eq}=(R_a/R_b)R_c$. Any deviation from or error in this condition is integrated until "nulled out". That is, heater $R_H$ warms $R_{r2}$ and $R_{t2}$ to a temperature at which $R_{eq}=(R_a/R_b)R_c$ and at said temperature the integrator input goes to zero and the integrator output becomes constant. At a constant pressure, this temperature, once achieved, is maintained since any deviation of the integrator input from zero causes appropriate compensating change in the integrator output, the heat output, and the temperature of the piezoresistors.

Although the FIG. 2 system will maintain $R_{eq}$ equal to $R_aR_c/R_b$, the FIG. 2 system does not maintain a perfectly constant temperature as the pressure P varies. That is, the parallel combination of $R_{r2}$ and $R_{t2}$ (i.e., $R_{eq}$) is still somewhat a function of pressure. However, $R_{eq}$ is considerably more insensitive to pressure changes than either $R_{r2}$ or $R_{t2}$ alone and the system maintains a piezoresistor temperature which is sufficiently constant to reduce temperature dependency enough to enable use of $R_{r1}$ and $R_{t1}$ in several pressure measuring applications. Furthermore, as indicated in FIG. 3, which except for the addition of $R_\beta$ is the same as FIG. 2, dependency of $R_{eq}$ upon pressure can be still further reduced by connecting a resistance $R_\beta$ in series with either $R_{r2}$ or $R_{t2}$, whichever has the larger magnitude of pressure sensitivity, such that $R_{eq}$, now redefined to incorporate the added series resistance $R_\beta$, is substantially independent of pressure. In FIG. 3, when $R_{t2}$ is the more pressure sensitive, the dashed line connections apply and $R_{eq}$ is redefined as $R_{r2}R_{t\Sigma}/(R_{r2}+R_{t\Sigma})$ where $R_{t\Sigma}=R_{t2}+R_\beta$. When $R_{r2}$ is the more pressure sensitive, the dotted line connections apply and $R_{eq}$ is redefined as $R_{t2}R_{r\Sigma}/(R_{t2}+R_{r\Sigma})$ where $R_{r\Sigma}=R_{r2}+R_\beta$.

It will be apparent to those skilled in the art that temperature conditioning means other than heater resistor $R_H$ may be used. For instance a surrounding oven, or heaters not unitary with the chip, could be employed.

Also, a temperature conditioning means capable of extracting heat as well as generating/adding heat could be employed.

Thus, while various embodiments of the present invention have been shown and/or described, it is apparent that changes and modifications may be made therein without departing from the invention in its broader aspects. The aim of the appended claims, therefore, is to cover all such changes and modifications as fall within the true spirit and scope of the invention.

What is claimed is:

1. Strain gauge characteristic stabilization apparatus comprising:
   resistance means $R_y$ and $R_z$ each including different strain sensitive resistance means which vary in opposite directions with variations in strain and vary in the same direction with variations in temperature, $R_y$ and $R_z$ being connected in parallel to form a composite resistance $R_y R_z/(R_y + R_z)$ hereinbelow referred to as $R_{cmp}$,
   temperature conditioning means sufficiently proximate said strain sensitive resistance means to influence the temperature thereof,
   circuit means connected between $R_{cmp}$ and said temperature conditioning means for (i) sensing deviation in $R_{cmp}$ from a predetermined resistance value $R_p$ and (ii) causing said temperature conditioning means, in response to said deviation, to effect, through temperature control of said strain sensitive resistance means, substantial equality between $R_{cmp}$ and $R_p$.

2. Apparatus as defined in claim 1 wherein said circuit means comprises:
   first circuit means connected to $R_{cmp}$ for producing a signal $S_\Delta$ indicative of said deviations in $R_{cmp}$ from $R_p$, and
   second circuit means responsive to $S_\Delta$ for causing said temperature conditioning means, through temperature control of said strain sensitive resistance means, to maintain $S_\Delta$ substantially equal to zero.

3. Apparatus as defined in claim 2 wherein said second circuit means comprises integrator means.

4. Apparatus as defined in claim 1 wherein said temperature conditioning means comprises means for generating heat.

5. Apparatus as defined in claim 1 wherein said strain sensitive resistance means comprise semiconductor material of the p or n-type carried by diaphragm means comprising semiconductor material of the other type.

6. Apparatus as defined in claim 1 wherein at least one of $R_y$ and $R_z$ comprises strain sensitive resistance means and, in series connection, a fixed resistance $R_\alpha$ of predetermined non-zero value.

* * * * *